(12) United States Patent
Mizutani et al.

(10) Patent No.: US 7,379,101 B2
(45) Date of Patent: *May 27, 2008

(54) PHOTOSENSOR SYSTEM AND DRIVE CONTROL METHOD FOR THE SAME

(75) Inventors: Yasushi Mizutani, Hamura (JP); Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1027 days.

This patent is subject to a terminal disclaimer.

(21) Appl. No.: 10/291,289

(22) Filed: Nov. 8, 2002

(65) Prior Publication Data

US 2003/0090583 A1    May 15, 2003

(30) Foreign Application Priority Data

Nov. 14, 2001    (JP)      ............................. 2001-349274

(51) Int. Cl.
- H04N 5/235 (2006.01)
- H04N 5/335 (2006.01)
- H04N 3/14 (2006.01)
- G06K 9/00 (2006.01)

(52) U.S. Cl. .................. 348/230.1; 348/362; 348/297; 382/124

(58) Field of Classification Search ............ 348/229.1, 348/230.1, 296, 294, 302, 304, 308, 362, 348/297; 382/124
See application file for complete search history.

(56) References Cited

U.S. PATENT DOCUMENTS

| | | | | |
|---|---|---|---|---|
| 4,689,686 A | * | 8/1987 | Hashimoto et al. ...... | 348/230.1 |
| 5,363,137 A | * | 11/1994 | Suga et al. ................. | 348/302 |
| 5,461,419 A | | 10/1995 | Yamada | |
| 5,463,420 A | * | 10/1995 | Yamada ..................... | 348/294 |
| 5,541,654 A | * | 7/1996 | Roberts ...................... | 348/301 |
| 5,563,658 A | * | 10/1996 | Parulski et al. ............. | 348/350 |
| 5,583,570 A | | 12/1996 | Yamada | |
| 6,181,375 B1 | * | 1/2001 | Mitsui et al. .......... | 348/240.99 |
| 6,441,849 B1 | * | 8/2002 | Fukuda .................... | 348/230.1 |
| 6,741,285 B2 | * | 5/2004 | Takizawa ................... | 348/364 |
| 6,867,811 B2 | * | 3/2005 | Nakamura et al. ......... | 348/362 |
| 6,879,344 B1 | * | 4/2005 | Nakamura et al. ......... | 348/362 |
| 7,268,807 B2 | * | 9/2007 | Nakamura et al. ....... | 348/229.1 |
| 2002/0085109 A1 | * | 7/2002 | Nakamura et al. ......... | 348/302 |

(Continued)

FOREIGN PATENT DOCUMENTS

JP      64-043733 A      2/1989

(Continued)

*Primary Examiner*—John M. Villecco
(74) *Attorney, Agent, or Firm*—Frishauf, Holtz, Goodman & Chick, P.C.

(57) ABSTRACT

A photosensor system includes an image read section which includes an image read region formed by arranging a plurality of photosensors in a matrix form. The image read region includes a sensitivity adjustment image read region, which is constituted of at least one of rows of the photosensors and columns. The image read section performs a read operation of a subject image by the image read region in accordance with an image read sensitivity. Read operation section is provided for sensitivity adjustment for performing a read operation for sensitivity adjustment which includes setting a charge accumulation period, reading an image for adjustment in the sensitivity adjustment image read region, and deriving an optimum image read sensitivity.

23 Claims, 15 Drawing Sheets

U.S. PATENT DOCUMENTS

| | | | |
|---|---|---|---|
| 2002/0101532 A1* | 8/2002 | Takayama et al. | 348/362 |
| 2002/0190229 A1* | 12/2002 | Nakamura et al. | 250/556 |
| 2005/0141048 A1* | 6/2005 | Mizutani | 382/124 |

FOREIGN PATENT DOCUMENTS

| | | |
|---|---|---|
| JP | 64-047178 A | 2/1989 |
| JP | 01-103076 A | 4/1989 |
| JP | 2000-041186 A | 2/2000 |
| JP | 2000-078484 A | 3/2000 |
| JP | 2001-136340 A | 5/2001 |
| JP | 2001-189828 A | 7/2001 |

* cited by examiner

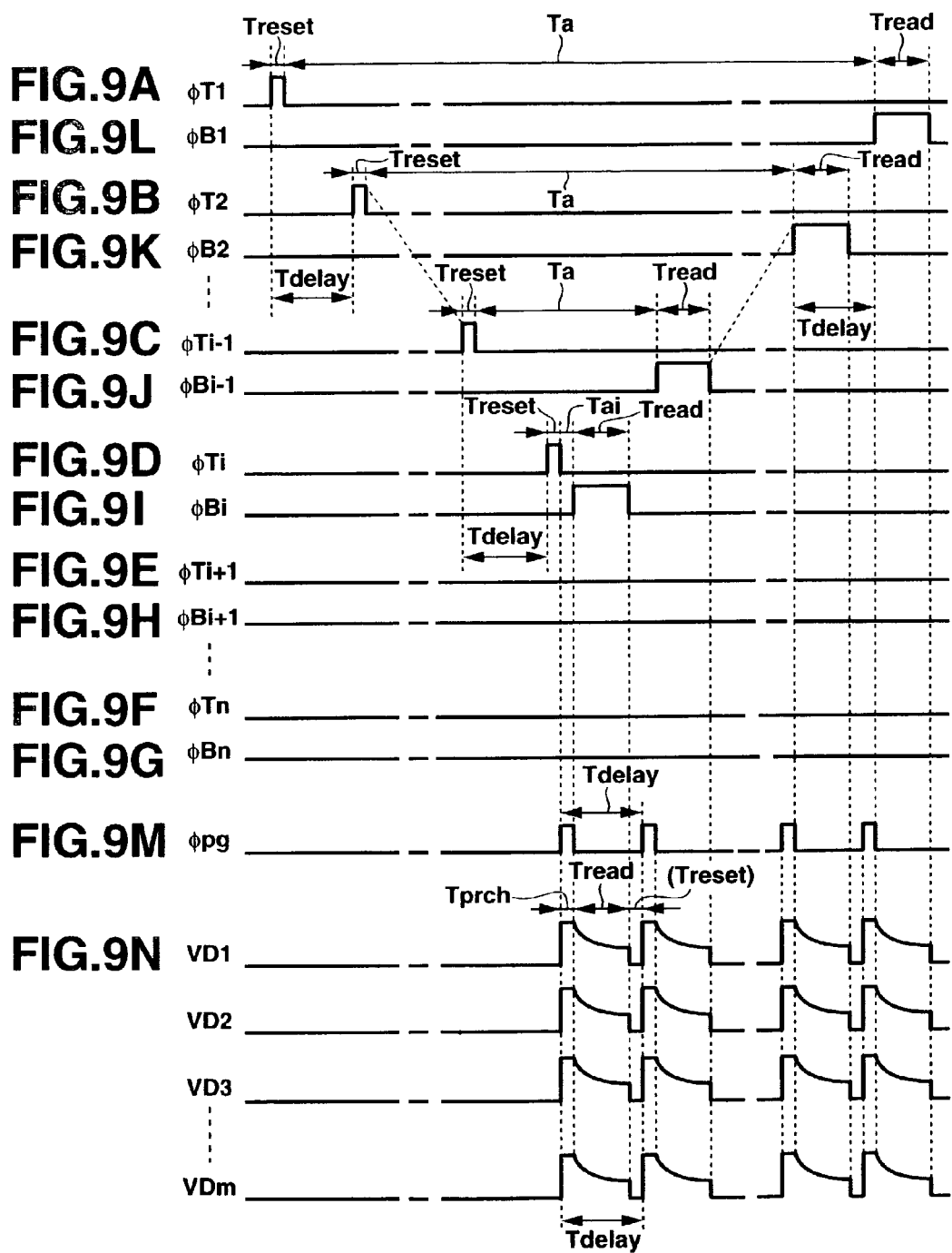

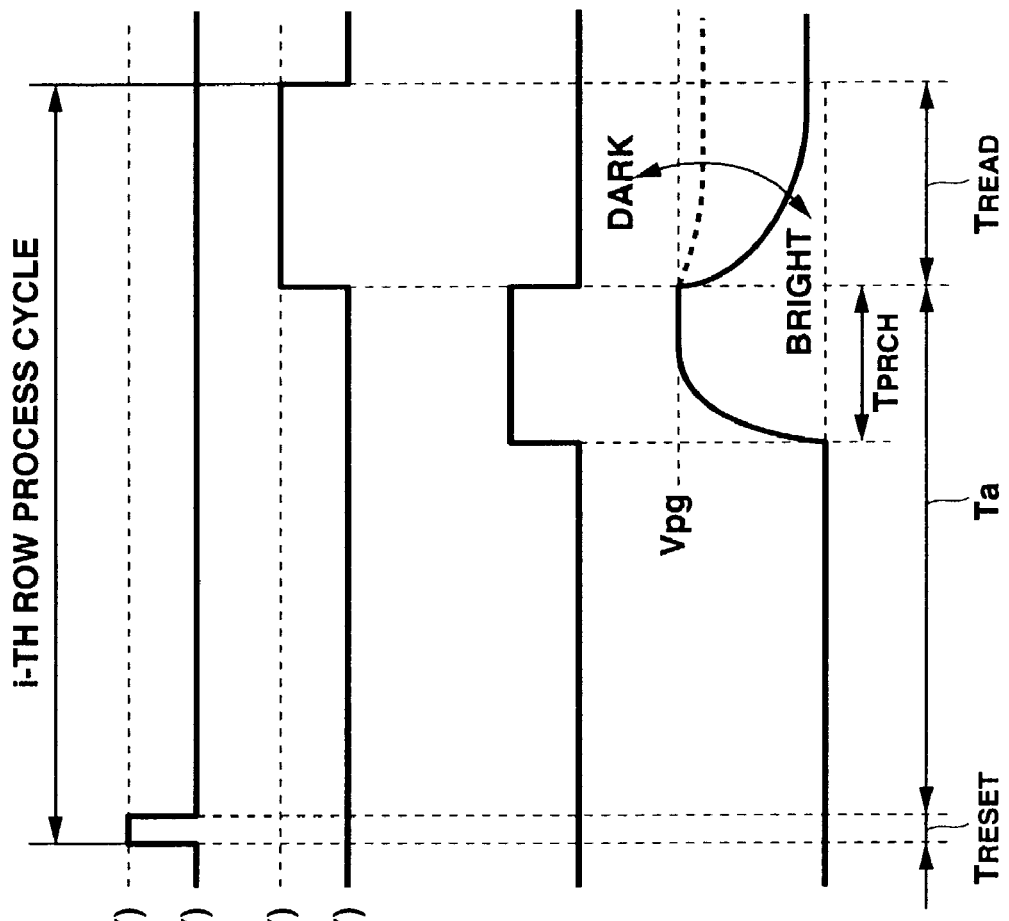

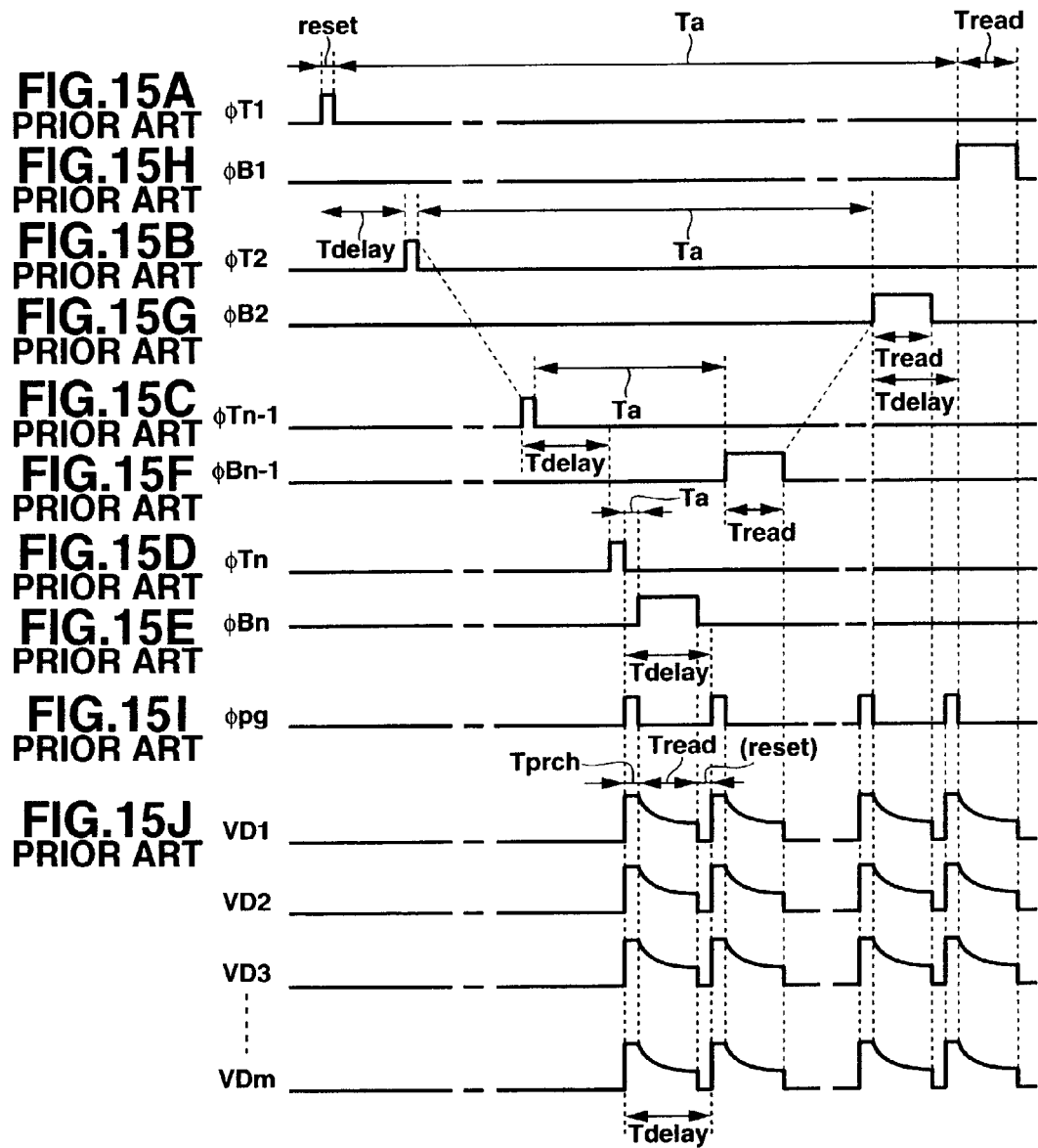

PHOTOSENSOR SYSTEM AND DRIVE CONTROL METHOD FOR THE SAME

CROSS-REFERENCE TO RELATED APPLICATIONS

This application is based upon and claims the benefit of priority from the prior Japanese Patent Application No. 2001-349274, filed Nov. 14, 2001, the entire contents of which are incorporated herein by reference.

BACKGROUND OF THE INVENTION

1. Field of the Invention

The present invention relates to a photosensor system including a photosensor array constituted by two-dimensionally arranging a plurality of photosensors, and a driving control method of the photosensor in the photosensor system.

2. Description of the Related Art

In recent years, a solid image pickup device has frequently been used, including a photosensor array constituted by arranging a plurality of photoelectric conversion devices (photosensors) in a linear or matrix form in order to pick up a subject image and convert the image to an image signal in image pickup apparatuses for picking up the subject image such as an electronic still camera and video camera, and an image read apparatus for reading a printed matter, photograph, and fine concave/convex shape of a fingerprint.

As this solid image pickup device, in general, a charge-coupled device (CCD) has been used. As well known, the CCD includes a constitution in which a plurality of photosensors such as photodiodes and thin film transistors (TFT) are arranged, and detects a charge amount of electron-positive hole pairs generated in accordance with a light amount with which a light receiving portion of each photosensor is irradiated by horizontal and vertical scanning circuits to sense luminance of an irradiation light.

In the photosensor system using this CCD, selection transistors need to be individually disposed in order to bring each scanned photosensor into a selection state. Therefore, there is a problem that with an increase of the number of pixels constituting the photosensor array, the system is accordingly enlarged.

On the other hand, as a constitution for solving the problem, we have developed a photosensor (hereinafter a double gate type photosensor) by a thin film transistor having a so-called double gate structure in which photosense and selection functions are imparted to the photosensor.

FIG. 12A is a sectional view showing a structure of a double gate type photosensor 10, and FIG. 12B shows an equivalent circuit of the double gate type photosensor 10.

The double gate type photosensor 10 includes: a semiconductor thin film 11 of amorphous silicon; n$^+$ silicon layers 17, 18 disposed on opposite ends of the semiconductor thin film 11; a source electrode 12 and drain electrode 13 respectively formed on the n$^+$ silicon layers 17, 18; a top gate electrode 21 formed above the semiconductor thin film 11 via a block insulating film 14 and upper gate insulating film 15; a protective insulating film 20 disposed on the top gate electrode 21 and upper gate insulating film 15; and a bottom gate electrode 22 formed below the semiconductor thin film 11 via a lower gate insulating film 16, and is formed on a transparent insulating substrate 19 such as a glass substrate.

The double gate type photosensor 10 constituted in this manner includes: an upper MOS transistor constituted of the semiconductor thin film 11, source electrode 12, drain electrode 13, and top gate electrode 21; and a lower MOS transistor constituted of the semiconductor thin film 11, source electrode 12, drain electrode 13, and bottom gate electrode 22. As shown in the equivalent circuit of FIG. 12B, it can be considered that the photosensor is constituted by using the semiconductor thin film 11 as a common channel region and combining two MOS transistors each including a top gate terminal (TG), bottom gate terminal (BG), source terminal (S), and drain terminal (D).

The protective insulating film 20, top gate electrode 21, upper gate insulating film 15, block insulating film 14, and lower gate insulating film 16 are all constituted of materials which have a high transmittance against a visible light for energizing the semiconductor thin film 11. When a light incident upon the top gate electrode 21 is transmitted through the top gate electrode 21, upper gate insulating film 15, and block insulating film 14, and incident upon the semiconductor thin film 11, charges (positive holes) are generated and accumulated in a channel region.

FIG. 13 is a schematic constitution diagram of a photosensor system constituted by arranging a plurality of double gate type photosensors 10 in a matrix form.

As shown in FIG. 13, the photosensor system includes: a sensor array 100 in which a plurality of double gate type photosensors 10 are arranged in the form of a matrix of n rows×m columns; a top gate line 101 and bottom gate line 102 in which the top gate terminal TG and bottom gate terminal BG of each double gate type photosensor 10 are respectively connected in a row direction; a top gate driver 110 and bottom gate driver 120 connected to the top gate line 101 and bottom gate line 102, respectively; a data line 103 in which the drain terminal D of each double gate type photosensor 10 is connected in a column direction; and an output circuit unit 130 connected to the data line 103.

In FIG. 13, φtg and φbg denote control signals for generating a reset pulse φTi and read pulse φBi described later, and φpg denotes a precharge pulse which controls a timing to apply a precharge voltage Vpg.

In this constitution, as described later, when the top gate driver 110 applies a predetermined voltage to the top gate terminal TG, the photosense function is realized. When the bottom gate driver 120 applies the predetermined voltage to the bottom gate terminal BG, and an output voltage of the photosensor 10 is taken into the output circuit unit 130 via the data line 103 and outputted as serial data Vout, the read function is realized.

FIGS. 14A to 14D are timing charts showing a basic driving control method with respect to the photosensor 10 of one row in the photosensor system, and show a detection operation period (i-th row process cycle) in an i-th row of the sensor array 100.

First, a high-level pulse voltage (reset pulse; e.g., Vtg=+15 V) φTi shown in FIG. 14A is applied to the top gate line 101 of the i-th row, and a reset operation is performed to discharge charges accumulated in the double gate type photosensor 10 of the i-th row in a reset period Treset.

Subsequently, when a low-level (e.g., Vtg=−15 V) bias voltage φTi is applied to the top gate line 101, the reset period Treset ends, and a charge accumulation period Ta by a charge accumulation operation into the channel region is started. In the charge accumulation period Ta, the charges (positive holes) are accumulated in the channel region in accordance with the amount of light incident from a top gate electrode side.

In parallel with the charge accumulation period Ta, a precharge period Tprch elapses in which the data line 103 has a precharge voltage Vpg, a precharge pulse φpg shown in FIG. 14C is applied, and the drain electrode 13 holds the charges. Thereafter, when a high-level (e.g., Vbg=+10 V) bias voltage (read pulse φBi) shown in FIG. 14B is applied to the bottom gate line 102, the double gate type photosensor 10 is brought into an ON state and a read period Tread starts.

In the read period Tread, the charges accumulated in the channel region act in a direction in which the low-level voltage (e.g., Vtg=−15 V) applied to the top gate terminal TG having a reverse polarity is relaxed. Therefore, the voltage Vbg of the bottom gate terminal BG forms an n-channel, and a voltage VD of the data line 103 indicates a tendency to gradually drop with an elapse of time from the precharge voltage Vpg in accordance with a drain current. That is, the change tendency of the voltage VD of the data line 103 depends on the charge accumulation period Ta and the amount of received light. As shown in FIG. 14D, when the incident light is dark and has a small light amount, and a small amount of charges are accumulated, the voltage indicates a tendency to moderately drop. When the incident light is bright and has a large amount of light, and a large amount of charges are accumulated, a tendency to steeply drop is indicated. Therefore, the amount of irradiation light is converted based on a value of the voltage VD of the data line 103 after the elapse of a predetermined time.

In the photosensor system shown in FIG. 13, for example, rows of the sensor array 100 are driven/controlled in parallel with one another based on the above-described driving control method and at a timing at which times of the respective driving pulses do not overlap. Thereby, reset, precharge, and read operations are prevented from being executed at overlapped times. Moreover, the read operation can be performed before the reset operations in all the rows end, and a time required for the read operation of a two-dimensional image can be reduced.

In the above-described photosensor system, the double gate type photosensor is used as the photosensor. However, this is not limited. Even in the photosensor system in which a photodiode or phototransistor is used as the photosensor, similarly operation steps include "the reset operation→charge accumulation operation→precharge operation→read operation", similar driving procedure is used, and the following similar problem occurs.

In the constitution of the above-described photosensor, the charges generated by the incident light are accumulated in the charge accumulation period, and bright/dark information of the subject image is detected based on the amount of charges. Therefore, when a subject is dark, and thus a small amount of charges are accumulated, the charge accumulation period is lengthened to obtain a sufficient detection sensitivity, and an image read sensitivity needs to be set to be high. On the other hand, when the subject is bright, and thus a large amount of charges are accumulated, the charge accumulation period is shortened in order to prevent the charges from being saturated, and the image read sensitivity needs to be set to be low. That is, it is necessary to appropriately set the image read sensitivity of the photosensor in accordance with the brightness of the subject so that the subject image is constantly satisfactorily read with appropriate sensitivity.

With various changes of place, time, and subject of the photosensor system for use, every time an ambient environment such as external illuminance, and/or a subject state changes, the brightness of the subject changes. Therefore, an appropriate image read sensitivity for satisfactorily reading the subject image changes every time. Then, it is necessary to perform an image read operation for obtaining and setting an appropriate image read sensitivity (hereinafter referred to as "read operation for sensitivity adjustment") before a normal read operation of the subject image.

Examples of the read operation for sensitivity adjustment include: an operation of setting the image read sensitivities of the photosensors of the respective rows to be different from one another in the photosensor system including the photosensor array in which the photosensors are arranged in the matrix form; and reading a predetermined image for adjustment with a plurality of image read sensitivities by the image read operation for one screen corresponding to the photosensor array.

FIGS. 15A to 15J show one example of a timing chart of the driving control method in the read operation for sensitivity adjustment of the photosensor system.

As shown in FIGS. 15A to 15D, the driving control method first comprises: successively applying reset pulses φT1, φT2, . . . Tn−1, φTn from the first row of the top gate line 101 of the double gate type photosensor 10, for example, at a time interval Tdelay; and successively initializing the double gate type photosensors 10 of the respective rows. Subsequently, when the reset period Treset ends, the charge accumulation period Ta successively starts in each row, and the charges (positive holes) are accumulated in the channel region of the double gate type photosensor 10 in accordance with the amount of incident light.

Subsequently, as shown in FIGS. 15E to 15H, after the reset pulse φTn falls with respect to the last row (n-th row), from the n-th to first rows, for each row, the charge accumulation period Ta is changed at a time interval of the pulse interval Tdelay corresponding to a sum of the read period Tread, precharge period Tprch, and reset period Treset, and read pulses φBn, φBn−1, . . . φB2, φB1 are applied to the respective rows at a timing at which the time of the read period Tread of each row does not overlap.

Moreover, as shown in FIG. 15I, prior to the application of the read pulses φBn, φBn−1, . . . φB2, φB1 to each row, the precharge pulse φpg is applied in parallel within the charge accumulation period set for each row, and the precharge voltage Vpg is applied to the drain line 103 of the double gate type photosensor 10 of each row for the precharge period Tprch.

Thereby, following the precharge period Tprch, the read period Tread is started, and voltage changes VD1, VD2, VD3, . . . VDm corresponding to the charges accumulated in each double gate type photosensor 10 as shown in FIG. 15J are taken in and read out by a column switch 131 via the data line 103.

According to the driving control method, the images read with the same number of stages of different image read sensitivities as the number of rows can be acquired by the image read operation of one screen. In this case, since the charge accumulation period Ta of each row changes at a time interval twice Tdelay, a change range of the image read sensitivity can relatively be increased. It is possible to obtain an optimum value of detection sensitivity in accordance with a broad range of changes of the ambient environment or detection object.

However, in an actual use state, an optimum image read sensitivity does not very largely change depending on the state of use environment or subject in some case. In this case, even when the range for changing the image read sensitivity is narrowed to a certain degree in the read operation for the sensitivity adjustment, there is no problem as confirmed.

On the other hand, when the above-described driving control method is used in the read operation for sensitivity adjustment, and when the read operation for sensitivity adjustment is executed using all row ranges of an image read region of the photosensor array, the charge accumulation period, that is, the change range of the image read sensitivity becomes larger than the required change range of the image read sensitivity depending on setting conditions such as the time interval of the charge accumulation periods for each row and the number of rows of the photosensor array. In this case, there is a problem that useless control process is performed and time is wasted.

Moreover, to solve the problem, the execution timings of the reset and read operations are controlled so that the change range of the image read sensitivity is limited only to a necessary range. Then, there is a problem that the image read by the normal image read operation is deteriorated as described later in detail.

SUMMARY OF THE INVENTION

According to the present invention, in a photosensor system which includes an image read region formed by arranging a plurality of photosensors in a matrix form including a plurality of rows and columns and which executes a read operation for sensitivity adjustment separately from a normal image read operation, the following problems are solved. A change range of an image read sensitivity in the read operation for sensitivity adjustment is enlarged more than necessary, useless control process is performed, time is wasted, and an image read by the normal image read operation is deteriorated because of the read operation for sensitivity adjustment. Therefore, the advantages are obtained that a time required for a sensitivity setting process is reduced and a satisfactory subject image can be obtained in the normal image read operation.

To obtain the above-described advantages, according to the present invention, there is provided a photosensor system comprising: an image read section for reading a subject image by an image read region in accordance with a predetermined image read sensitivity; and a read operation section for sensitivity adjustment for performing a read operation for sensitivity adjustment to set a charge accumulation period only with respect to a photosensor of each row of an image read region for sensitivity adjustment including some of a plurality of rows in the image read region and a plurality of columns, and read an image for adjustment in the image read region for sensitivity adjustment based on the charge accumulation period to derive an optimum image read sensitivity suitable for a read operation of the subject image in the image read section.

The read operation section for sensitivity adjustment includes: a reset section for applying a reset pulse to each row of the image read region for sensitivity adjustment of at least a photosensor array and initializing a plurality of photosensors of each row of the image read region for sensitivity adjustment; a precharge section for applying precharge pulses of a predetermined voltage to the plurality of photosensors to precharge the plurality of photosensors; a read section for applying read pulses to the plurality of photosensors of each row of the image read region for sensitivity adjustment, after the initialization ends, the charge accumulation period in which charges generated by an incident light are accumulated elapses, and a precharge operation to apply the precharge pulses ends; and an output section for reading the voltage which is applied by the precharge operation and which changes in accordance with the charges accumulated in the charge accumulation period and outputting an output voltage in a read period in which the read pulses are applied.

The read operation for sensitivity adjustment is executed at an optimal timing prior to at least the read operation of the subject image by the image read section, at least a timing to apply the reset pulse to each row by the reset section does not overlap with a timing to apply the read pulse to each row by the read section, the charge accumulation period of each row changes in a plurality of stages every predetermined rows, and the charge accumulation period of each row is controlled to have an overlapped time between at least two different rows.

According to the present invention, a first read operation section for sensitivity adjustment performs control in the read operation for sensitivity adjustment to successively apply the reset pulse to the photosensor of each row of the image read region of the photosensor array, successively apply the read pulse, and have the charge accumulation period with respect to the photosensor of each row of the image read region for sensitivity adjustment.

Moreover, according to the present invention, a second read operation section for sensitivity adjustment performs control in the read operation for sensitivity adjustment to successively apply the reset pulse to the photosensor of each row of the image read region of the photosensor array and successively apply the read pulse to the photosensor of each row of the image read region for sensitivity adjustment of the photosensor array.

Furthermore, according to the present invention, a third read operation section for sensitivity adjustment performs control in the read operation for sensitivity adjustment to successively apply the reset and read pulses to the photosensor of each row of the image read region for sensitivity adjustment of the photosensor array.

Here, at least the application of the reset and read pulses to the photosensor of each row of the image read region for sensitivity adjustment is controlled, for example, so that the pulses are applied in an opposite row order.

Moreover, the read operation section for sensitivity adjustment includes: an image read section for adjustment for reading an image for adjustment with a plurality of image read sensitivities based on the charge accumulation period; and an optimum image read sensitivity derivation section for deriving an optimum image read sensitivity based on the image for adjustment read by the image read section for adjustment for each image read sensitivity. The optimum image read sensitivity derivation section includes a section for calculating a data range based on maximum and minimum values of a pixel data group for each image read sensitivity based on an image pattern of the image for adjustment read by the image read section for adjustment; and extracting the image read sensitivity having a maximum data range as an optimum image read sensitivity.

Thereby, the change range of the image read sensitivity in the read operation for sensitivity adjustment is limited only to a necessary range. The generation of useless control process and waste of time in the sensitivity setting process is reduced. The read operation for sensitivity adjustment can quickly be performed, and an appropriate image read sensitivity can be set. Moreover, the normal read image is inhibited from being deteriorated by the read operation for sensitivity adjustment, and a satisfactory subject image can be obtained.

BRIEF DESCRIPTION OF THE DRAWINGS

FIGS. 9A to 9N are timing charts showing a third embodiment of the driving control method in the read operation for sensitivity adjustment of the photosensor according to the present invention;

FIGS. 14A to 14D are timing charts showing a basic driving control method in a conventional photosensor system including the double gate type photosensors; and FIGS. 15A to 15J are timing charts of the driving control method in the read operation for sensitivity adjustment of the photosensor system.

DETAILED DESCRIPTION OF THE INVENTION

Figure 1:
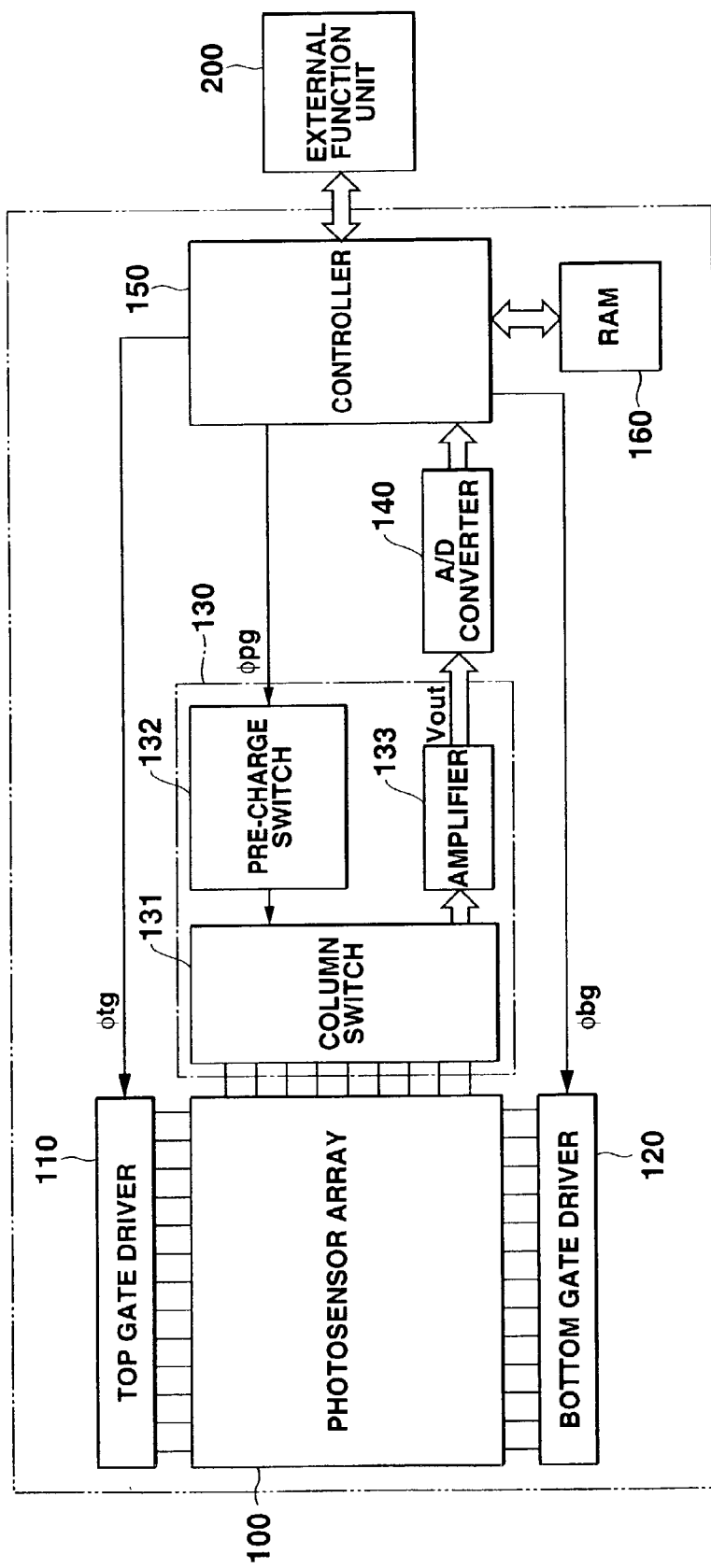
FIG. 1 is a block diagram showing the overall constitution of a two-dimensional image read apparatus to which a photosensor system according to the present invention is applied.

Details of a photosensor system in the present invention and a driving control method of a photosensor in the photosensor system will be described hereinafter with reference to embodiments shown in the drawings.

<Two-Dimensional Image Read Apparatus>

Figure 12A:
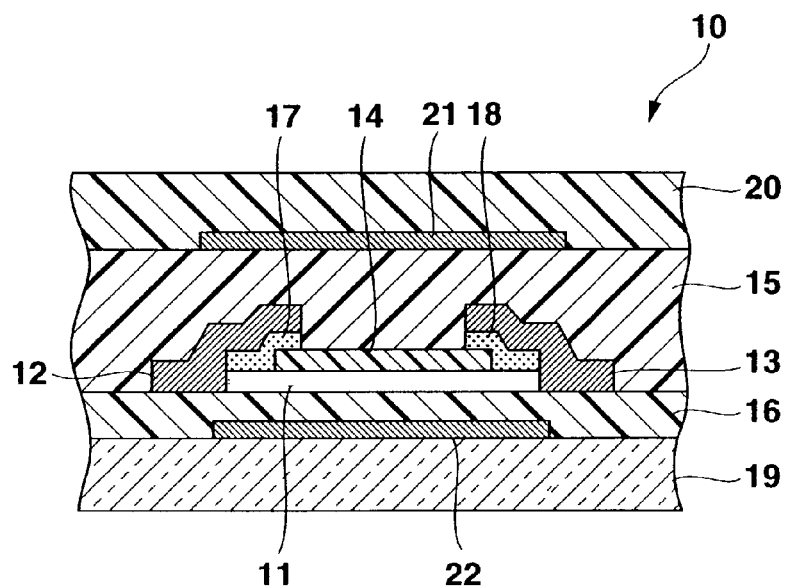
FIG. 12A is a sectional view showing a structure of a conventional double gate type photosensor.
Figure 12B:
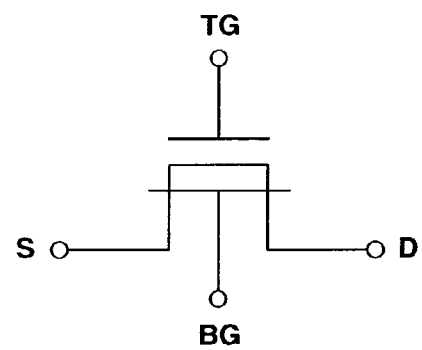
FIG. 12B is an equivalent circuit diagram of the double gate type photosensor.

FIG. 1 is a block diagram showing the overall constitution of the two-dimensional image read apparatus to which the photosensor system according to the present invention is applied. It is to be noted that the constitution will be described appropriately with reference to the constitutions of the double gate type photosensor and photosensor system shown in FIGS. 12A, 12B, 13. Moreover, the constitution similar to that of the photosensor system shown in FIG. 13 is denoted with the same reference numerals, and the description thereof is simplified or saved.

Figure 13:
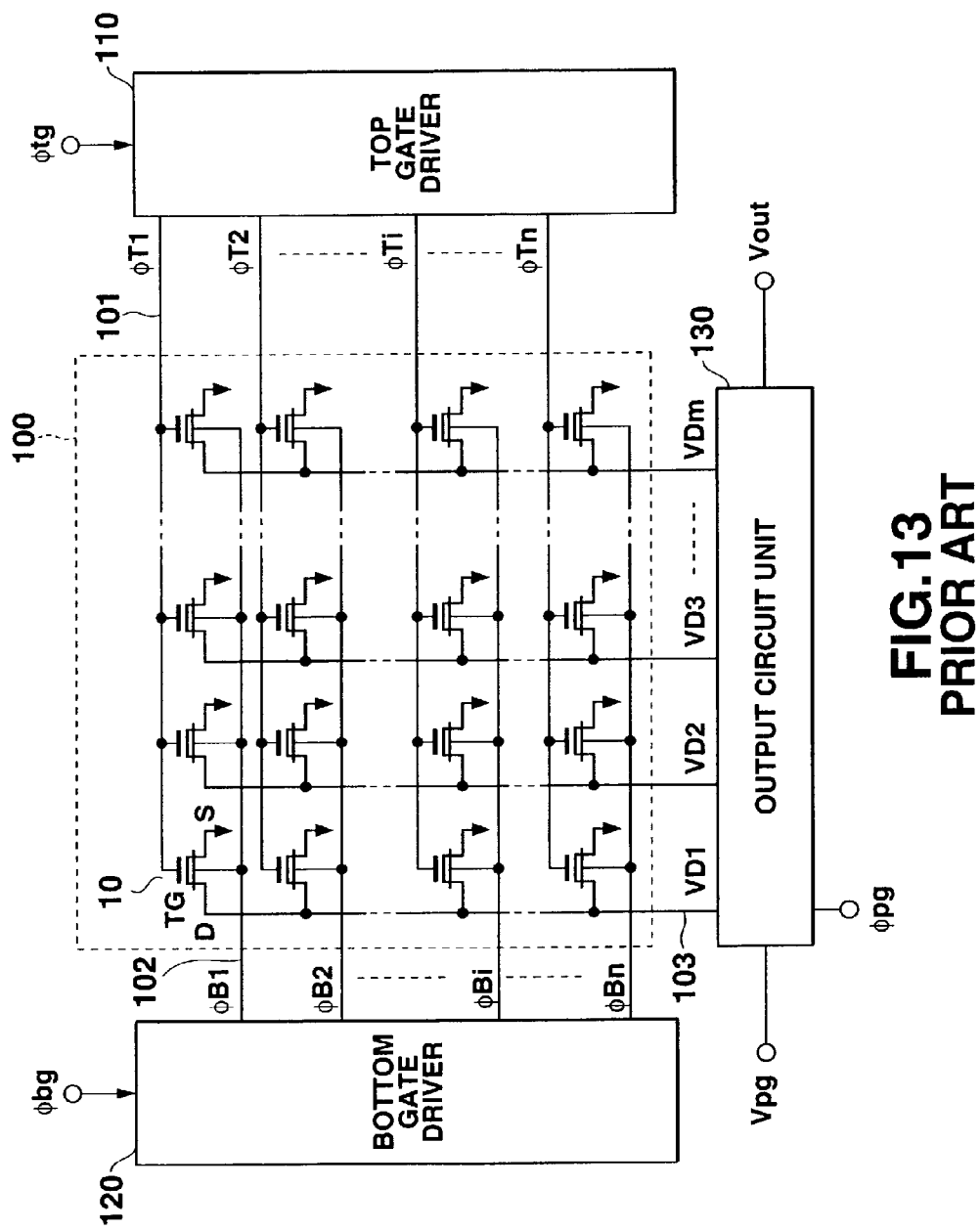
FIG. 13 is a schematic constitution diagram of a photosensor system constituted by two-dimensionally arranging double gate type photosensors.

As shown in FIG. 1, similarly as the photosensor system shown in FIG. 13, the two-dimensional image read apparatus according to the present embodiment basically includes:

a photosensor array 100 constituted by arranging a plurality of double gate type photosensors 10 in a matrix form, and including an image read region of n rows×m columns;

a top gate driver 110 which applies a predetermined top gate voltage forming a reset pulse to a top gate terminal TG of the double gate type photosensor 10 at a predetermined timing;

a bottom gate driver 120 which applies a predetermined bottom gate voltage forming a read pulse to a bottom gate terminal BG of the double gate type photosensor 10 at a predetermined timing;

a drain driver 130 including a column switch 131 which applies a precharge voltage to the double gate type photosensor 10 and reading a drain voltage, a precharge switch 132, and an amplifier 133;

an analog-digital converter (hereinafter referred to as the "A/D converter") 140 which converts the drain voltage of a read analog signal to image output signal (image data) including a digital signal;

a controller 150 including a function of controlling a read operation of a subject image by the photosensor array 100, collating the image data, exchanging data with an external function unit 200 which executes a predetermined process such as a processing, and executing/controlling the image read operation and a read operation for sensitivity adjustment described later (i.e., a driving control method of the photosensor according to the present invention); and a RAM 160 in which read image data and data associated with a setting of an image read sensitivity are stored.

Here, since the photosensor array 100, top gate driver 110, bottom gate driver 120, and drain driver 130 have a constitution and function similar to those of the photosensor system shown in FIG. 13, detailed description thereof is omitted.

The controller 150 outputs control signals φtg, φbg to the top gate driver 110 and bottom gate driver 120 respectively, and, as shown in FIG. 13, controls operations of the top gate driver 110 and bottom gate driver 120 for applying predetermined signal voltages of a reset pulse φTi and read pulse φBi to the top gate terminal TG and bottom gate terminal BG of each double gate type photosensor 10 which constitutes the photosensor array 100.

Moreover, the controller 150 outputs a precharge pulse φpg to the precharge switch 132 in the read operation of the subject image, and thereby controls an operation of applying a precharge voltage Vpg to the drain terminal D of each double gate type photosensor 10 and detecting a drain voltage VD corresponding to a charge amount accumulated in each double gate type photosensor 10 in accordance with a read subject image pattern.

Furthermore, an output voltage Vout outputted from the drain driver 130 is converted to the digital signal via the A/D converter 140, and inputted as an image output signal to the controller 150. The controller 150 subjects the image output signal to a predetermined image processing, writes/reads the signal with respect to the RAM 160, and further includes a function of an interface with respect to the external function unit 200 to execute predetermined processes such as collating and processing of the image data.

Additionally, the controller 150 executes a timing control in the read operation for sensitivity adjustment described later similarly as the driving control method shown in FIGS. 15A to 15J. Moreover, the controller has a function of controlling application timings of the reset, precharge, and read pulses and extracting/setting an image read sensitivity suitable for the normal image read operation, so that a charge accumulation period set for each row successively changes with respect to a row range included in an image read region for sensitivity adjustment described later in at least an image read region of the photosensor array 100.

The driving control method of the photosensor in the photosensor system according to the present invention will next be described in detail.

The driving control method according to the present invention is applied to the read operation for sensitivity adjustment, and executed prior to a normal operation of reading the subject image, for example, at optional timings such as a timing immediately before the normal subject image read operation and a timing at which a use environment changes.

Note that in the following embodiments, the above-described double gate type photosensor is applied as the photosensor. However, the constitution of the present invention is not limited to the double gate type photosensor, and can also similarly be applied to the photosensor system in which the photosensor including another constitution is used.

First Embodiment

Figure 2:
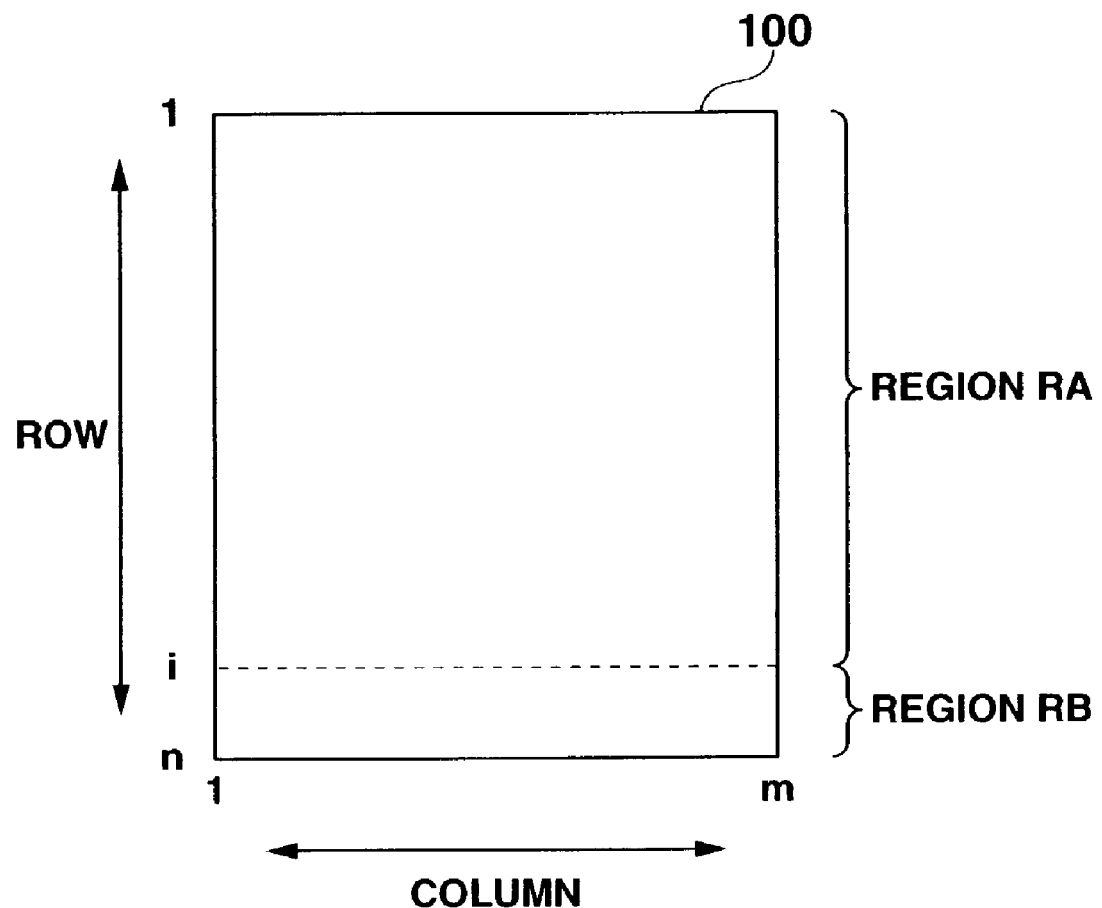
FIG. 2 is a schematic view of a region division state of an image read region in a photosensor array according to the present invention.
Figure 3:
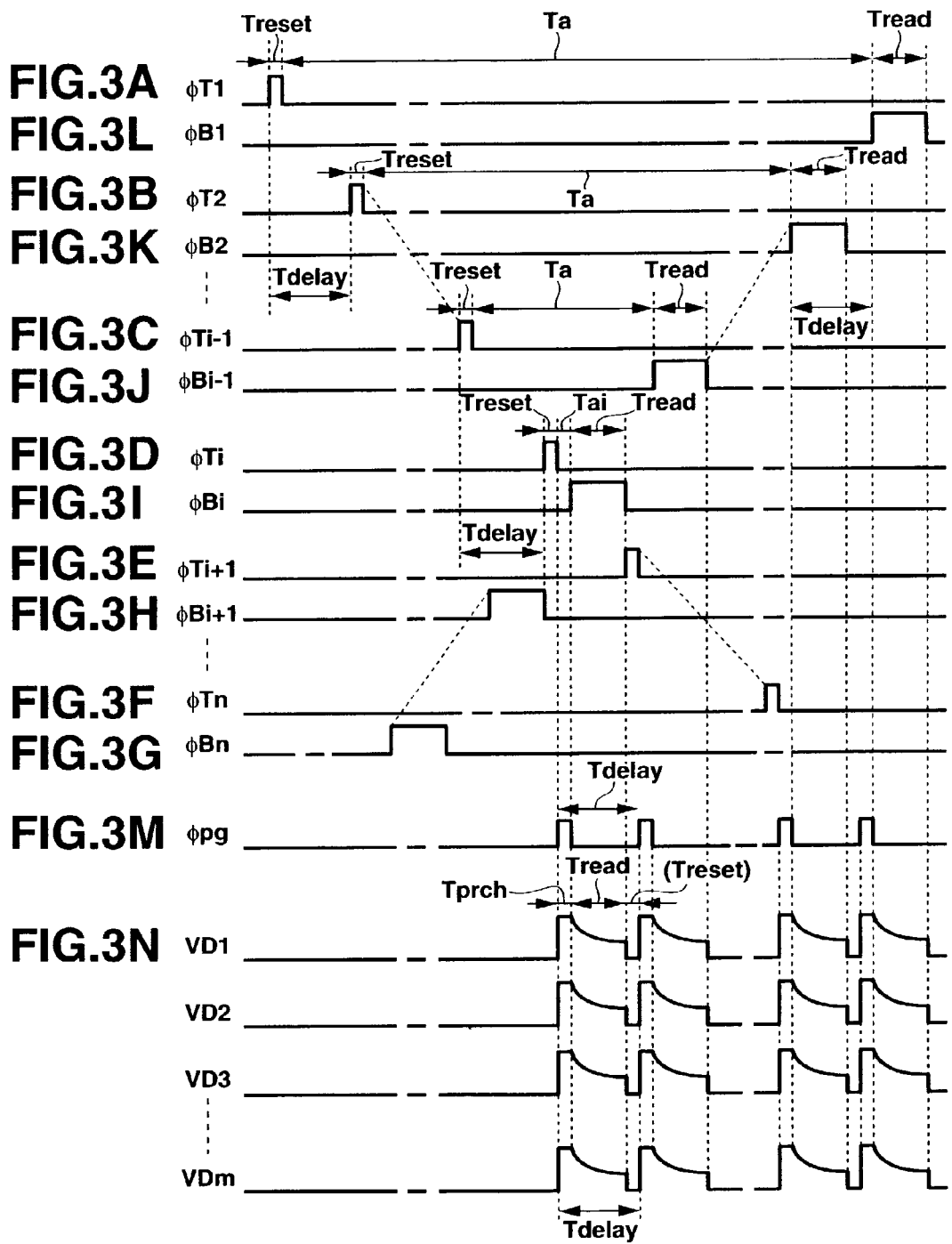
FIGS. 3A to 3N are timing charts showing a first embodiment of a driving control method in a read operation for sensitivity adjustment of the photosensor system according to the present invention.
Figure 4:
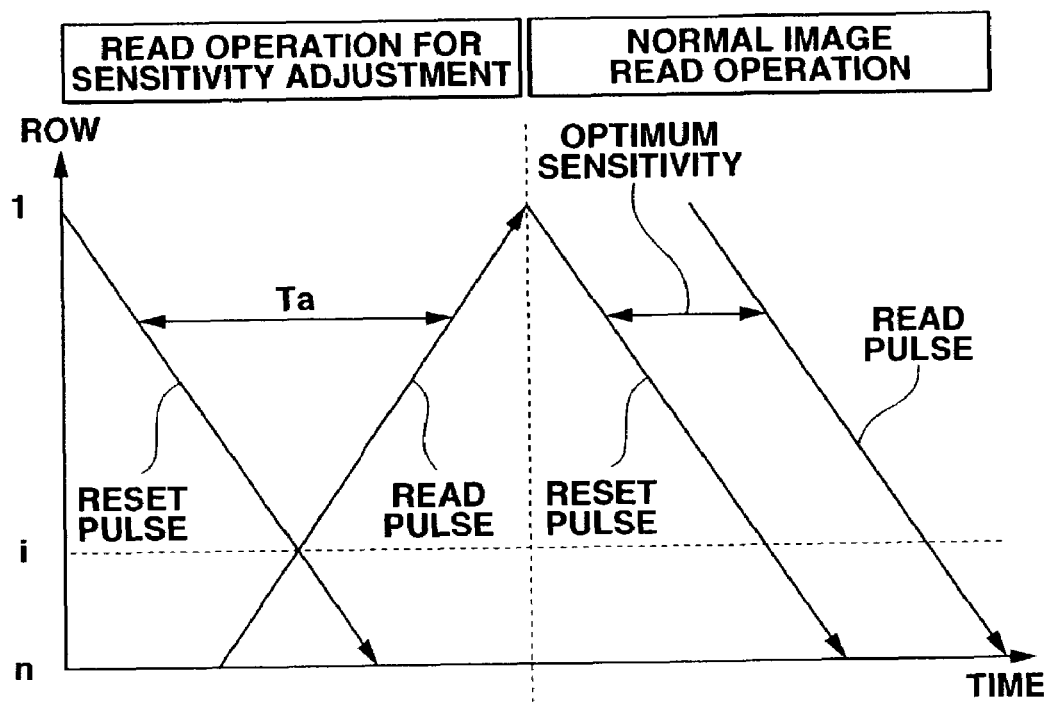
FIG. 4 is a schematic view showing application states of reset and read pulses in the first embodiment.

FIG. 2 is a schematic view showing a region division state of the image read region in the photosensor array according to the present invention;

FIGS. 3A to 3N are timing charts showing a first embodiment of the driving control method in the read operation for sensitivity adjustment of the photosensor system according to the present invention; and FIG. 4 is a schematic view showing application states of the reset and read pulses in the first embodiment.

Here, the driving control method will be described appropriately with reference to the photosensor system shown in FIG. 13.

The driving control method in the read operation for sensitivity adjustment of the photosensor according to the present invention is effective, when the driving control method shown in FIGS. 15A to 15J is applied to the read operation for sensitivity adjustment as described above to use all row ranges of the image read region of the photosensor, and a change range of an image read sensitivity becomes larger than a required change range.

In the present invention, as shown in FIG. 2, the image read region including n rows×m columns in the photosensor array 100 is divided, for example, into a first region RA ranging to an i-th row from a first row (i is an optional natural number; i=1, 2, . . . n), and a second region RB of a row range not included in the region RA (e.g., ranging to an n-th row from the i-th row). The region RA is used as an image read region for sensitivity adjustment. In the present invention, in this region RA (image read region for sensitivity adjustment), the read operation for sensitivity adjustment described later is performed.

First, as shown in FIGS. 3A to 3F, the driving control method of the first embodiment comprises: successively applying reset pulses φT1, φT2, . . . φTn−1, φTn at deviating timings in a forward direction from first to n-th rows of the top gate line 101 in which the top gate terminals TG of the double gate type photosensors 10 are connected in a row direction at a time interval using a pulse interval Tdelay as a basis, so that the double gate type photosensors 10 of each row are successively initialized.

Subsequently, a reset period Treset ends, a charge accumulation period Ta successively starts in each row, and charges are accumulated in a channel region in accordance with an amount of light incident upon the double gate type photosensor 10.

On the other hand, as shown in FIGS. 3G to 3L, in parallel with the above-described reset operation of successively applying the reset pulses to the first to n-th rows of the top gate line 101 in the forward direction, and at an optional timing which does not overlap with the application timing of the reset pulse, read pulses φBn, φBn−1, . . . φB2, φB1 are successively applied at deviating timings in a reverse direction from n-th to first rows of the bottom gate line 102 in which the bottom gate terminals BG of the double gate type photosensors 10 are connected in the row direction at the time interval using the pulse interval Tdelay as the basis.

Here, the application timings of the read pulses φBn, φBn−1, . . . φB2, φB1 are set so that a charge accumulation period Tai from the application of the reset pulse φTi till the application of the read pulse φBi in an i-th row as a boundary of the first and second regions RA, RB is short as compared with the charge accumulation period in the first to i-th rows.

Moreover, as shown in FIG. 3M, a precharge pulse φpg is applied to the precharge switch 132 only with respect to the double gate type photosensors connected to the i-th to first row bottom gate lines 102 included in the first region RA prior to the application of the reset pulses φBi, φBi−1, . . . φB2, φB1 and in parallel with the charge accumulation period set for each row. Thereby, the precharge voltage Vpg is applied to the data line 103 of each-row double gate type photosensor 10 for a precharge period Tprch, and subsequently a read period Tread starts.

Thereby, the charge accumulation period Ta in each of the i-th to first rows is set so as to increase at a time interval twice a pulse interval Tdelay using the charge accumulation period Tai set for the i-th row as a minimum period. That is, the charge accumulation period Ta of each row is represented by the following equation (1).

$$Ta = 2 \times Tdelay \times L + Tai \qquad (1)$$

Here, L is a variable including an integer of 0 or more, and the value of L is 0, 1, . . . , i−2 in the i-th to first rows. That is, assuming that the charge accumulation period Tai set for the i-th row is a very small time (≅0), as shown in FIG. 4, by a read process of one screen, the charge accumulation period Ta is substantially set to i types of different values indicating integral multiples of the time twice the pulse interval Tdelay. Thereby, the read process (charge accumulation operation) is executed by i types of different image read sensitivities.

Furthermore, by the application of the above-described read pulses φBi, φBi−1, . . . φB2, φB1, in the i-th to first-row double gate type photosensors 10 included in the first region RA in which the different charge accumulation periods Ta are set, as shown in FIG. 3N, voltage changes VD1, VD2, VD3, . . . VDm corresponding to the charges accumulated in the respective charge accumulation periods Ta are taken in and read out by the column switch 131 via the drain line 103.

On the other hand, in the double gate type photosensors 10 of the n-th to i+1-th rows in the second region RB, after the read pulses φBn, φBn−1, . . . φBi+1 are applied, reset pulses φTi+1, ... φTn−1, φTn are applied, the charge accumulation period Ta is not set, and the voltage changes VD1, VD2, VD3, ... VDm are not substantially read.

Here, with respect to the double gate type photosensors 10 of the (i+1)-th to n-th rows included in the second region RB, in order opposite to the order in the double gate type photosensors included in the first region RA, the reset and read pulses are applied. When this state is set to be continued as it is, for example, the application timing of each pulse for each row is set to be the same as the timing in the normal image read operation executed after the read operation for sensitivity adjustment, and the driving control related to the image read can be simplified.

That is, the double gate type photosensors 10 of the first to i-th rows included in the region RA are used in the read operation of the image for adjustment, the read data is outputted, and the sensors contribute to a sensitivity setting process. The double gate type photosensors 10 of the (i+1)-th to n-th rows included in the region RB are not used in the read operation of the image for adjustment, the read data is not outputted, and the sensors do not contribute to the sensitivity setting process.

Examples of a method of setting an optimum image read sensitivity (charge accumulation period) based on the image for adjustment read by the above-described read operation for sensitivity adjustment include a method comprising: comparing the change ranges (dynamic ranges) of brightness data of each image read sensitivity of the read image for adjustment with one another; extracting the image read sensitivity at which the dynamic range is maximized; and setting the extracted image read sensitivity as the optimum image read sensitivity.

Here, the normal image read operation using the optimum sensitivity set by the above-described series of sensitivity setting process may comprise: for example, as shown in FIG. 4, applying the reset, precharge, and read pulses of each row so as to have the charge accumulation period corresponding to the optimum sensitivity; and successively applying the pulses at deviating timings in the forward direction from the first to n-th rows at the time interval using the predetermined pulse interval Tdelay as a basis; or successively applying the pulses at the deviating timings in the reverse direction from the n-th to first rows at the predetermined time interval.

Note that the read operation for sensitivity adjustment is not limited to the above-described method of successively applying the reset pulses in the forward direction from the first to n-th rows, and successively applying the read pulses in the reverse direction from the n-th to first rows. The operation may comprise: successively applying the reset pulses in the reverse direction from the n-th to first rows, and successively applying the read pulses in the forward direction from the first to n-th rows.

In this manner, for the read operation for sensitivity adjustment to which the driving control method of the first embodiment is applied, in the method of setting the image read sensitivities different with the respective rows by one read operation for sensitivity adjustment to read the image, only the photosensors in the predetermined image read region for sensitivity adjustment can be used to execute the read operation of the image for adjustment.

Thereby, the image for adjustment can be read only by the image read sensitivity of the necessary range. This solves the above-described problems that the image read sensitivity is successively changed with respect to all row ranges of the image read region of the photosensor array, thereby the sensitivity adjustment range is enlarged more than necessary, an excessively long charge accumulation time is set, thereby a useless read operation time is generated, and a useless control process for an optimum sensitivity extraction process is generated. Therefore, the read operation for sensitivity adjustment can quickly be performed, and an appropriate image read sensitivity can be set.

Second Embodiment

A second embodiment of the driving control method of the photosensor according to the present invention will next be described with reference to the drawings.

Figure 5:
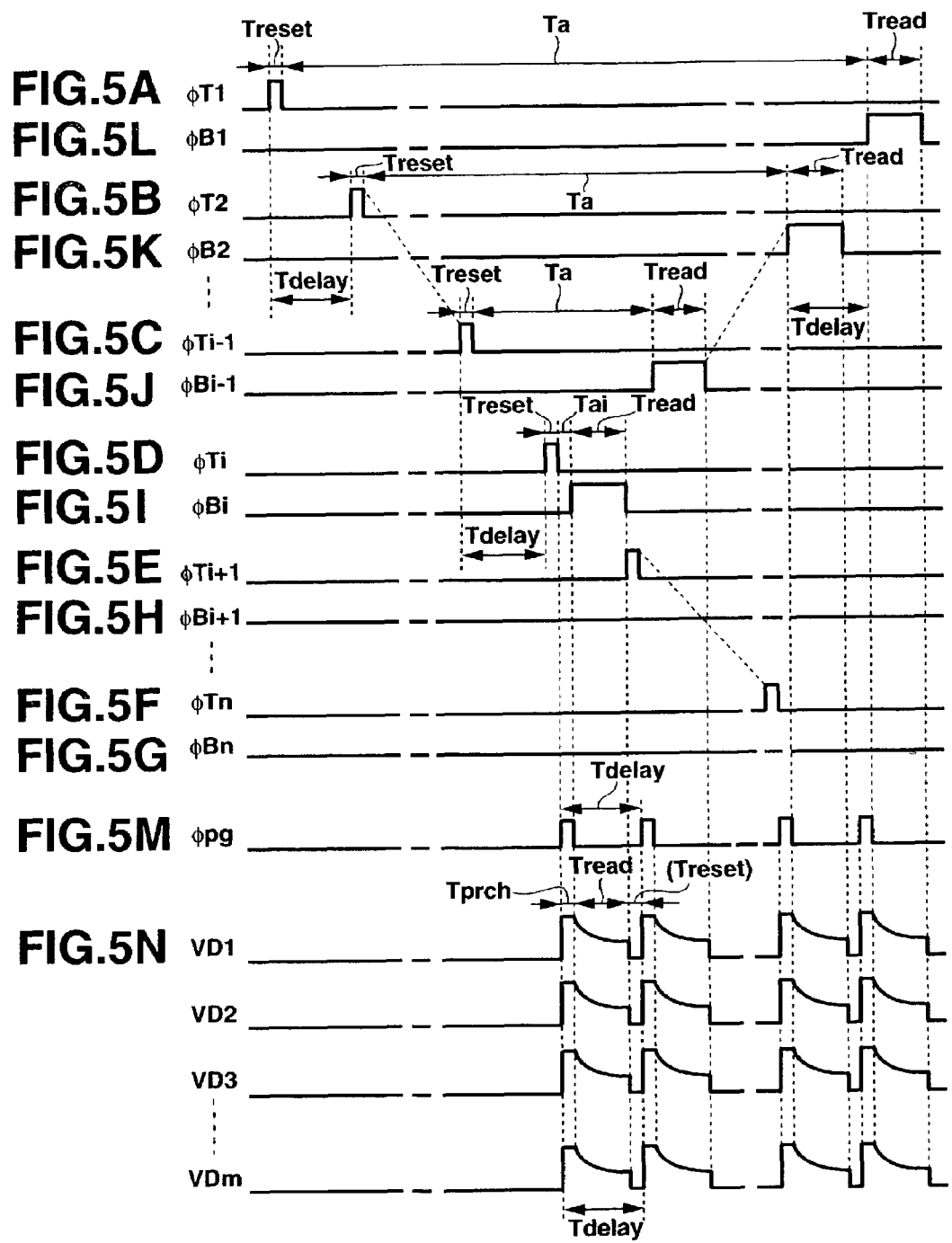
FIGS. 5A to 5N are timing charts showing a second embodiment of the driving control method in the read operation for sensitivity adjustment of the photosensor system according to the present invention.
Figure 6:
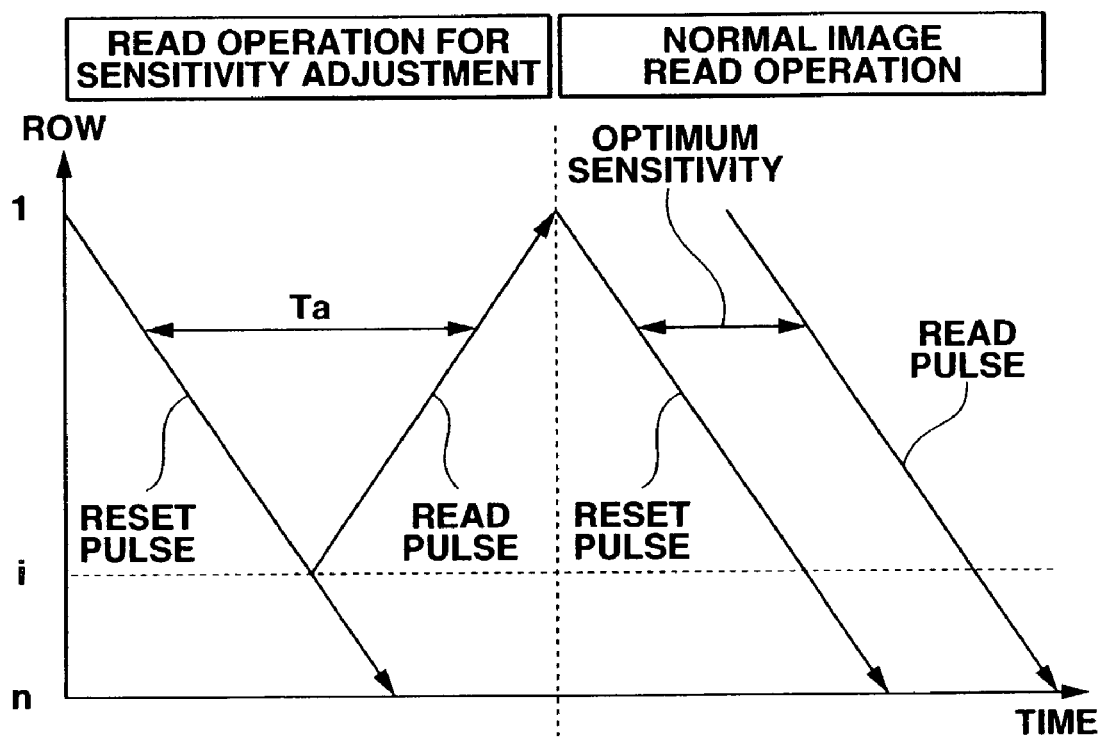
FIG. 6 is a schematic view showing the application states of reset and read pulses in the second embodiment.

FIGS. 5A to 5N are timing charts showing the second embodiment of the driving control method in the read operation for sensitivity adjustment of the photosensor system according to the present invention; and FIG. 6 is a schematic view showing the application states of the reset and read pulses in the second embodiment.

Here, the driving control method will also be described appropriately with reference to the photosensor system shown in FIG. 13. Moreover, the description of the control method equal to that of the first embodiment is simplified.

The second embodiment is different from the first embodiment in that the read pulses are not applied to the double gate type photosensors of the (i+1)-th to n-th rows included in the second region RB of the photosensor array.

First, as shown in FIGS. 5A to 5F, the driving control method in the read operation for sensitivity adjustment according to the second embodiment comprises: successively applying the reset pulses φT1, φT2, ... φTn−1, φTn at the deviating timings in the forward direction from the first to n-th rows of the top gate line 101 at the time interval using the pulse interval Tdelay as the basis, so that the double gate type photosensors 10 of each row are successively initialized.

Subsequently, the reset period Treset ends, the charge accumulation period Ta successively starts in each row, and the charges are accumulated in the channel region in accordance with the amount of light incident upon the double gate type photosensor 10 for each row.

Subsequently, as shown in FIGS. 5I to 5L, at a timing at which the reset operation of applying the reset pulses to the top gate lines 101 of the first to i-th rows included in the region RA of the photosensor array ends, and at an optional timing which does not overlap with the application timing of the reset pulses, the read pulses φBi, ... φB2, φB1 are successively applied at the deviating timings in the reverse direction from the i-th to first rows of the bottom gate line 102 at the time interval using the pulse interval Tdelay as the basis.

Here, also in the second embodiment, the application timings of the read pulses φBi, ... φB2, φB1 are set so that the charge accumulation period Tai from the application of the reset pulse φTi till the application of the read pulse φBi in the i-th row as the boundary of the regions RA, RB is minimum (shortest). In the second embodiment, the charge accumulation period Ta in each of the (i−1)-th to first rows increases at the time interval twice the pulse interval Tdelay, and is set as in the above equation (1) similarly as the first embodiment.

Here, the reset pulses successively applied to the double gate type photosensors of the first to i-th rows included in the region RA at the time interval of the pulse interval delay are successively applied to the (i+1) to n-th rows included in the region RB continuously at the same time interval.

That is, the read pulses are not applied, and only the reset pulses are applied to the double gate type photosensors of the (i+1)-th to n-th rows included in the region RB.

Furthermore, as shown in FIG. 5M, the precharge pulse φpg is applied to the precharge switch 132 with respect to the double gate type photosensors connected to the i-th to first row bottom gate lines 102 prior to the application of the read pulses φBi, φBi−1, . . . φB2, φB1 and in parallel with the charge accumulation period set for each row. Thereby, the precharge voltage Vpg is applied to the data line 103 of each-row double gate type photosensor 10 for the precharge period Tprch, and subsequently the read period Tread starts.

Subsequently, by the application of the above-described read pulses φBi, φBi−1, . . . φB2, φB1, in the double gate type photosensors 10 of the i-th to first rows included in the region RA in which the respective different charge accumulation periods Ta are set, as shown in FIG. 5N, the voltage changes VD1, VD2, VD3, . . . VDm corresponding to the charges accumulated in the respective charge accumulation periods Ta are taken in and read out by the column switch 131 via the drain line 103.

Thereby, similarly as the above-described first embodiment, as shown in FIG. 6, by the read process of one screen in which only the photosensors of the predetermined image read region for sensitivity adjustment of the photosensor array are used, the i types of different image read sensitivities are set. Moreover, the image for adjustment can be read with the image read sensitivity only of the necessary range in the normal image read operation. Therefore, the useless control process and waste of time in the read operation for sensitivity adjustment are reduced, and the image read sensitivity can quickly and easily be set.

A relation between the read operation for sensitivity adjustment according to the embodiment and an image quality of the read image in the normal image read operation will next be described in detail with reference to the drawings.

Figure 7A:
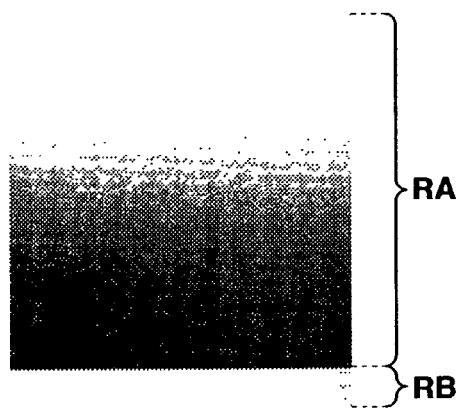
FIGS. 7A to 7D show one example of read image data showing a relation between the read operation for sensitivity adjustment according to the first embodiment and an image quality of the read image in a normal image read operation.
Figure 7B:
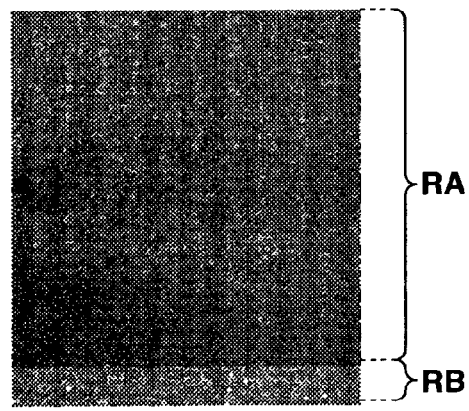
Figure 7D:
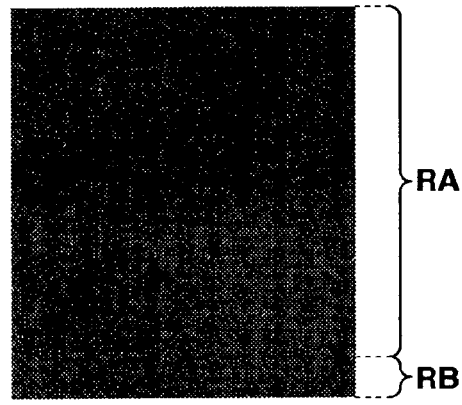
Figure 7C:
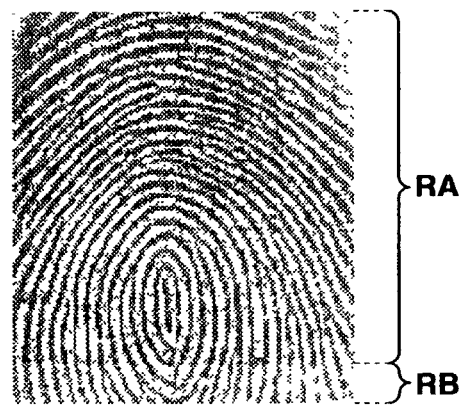
Figure 8A:
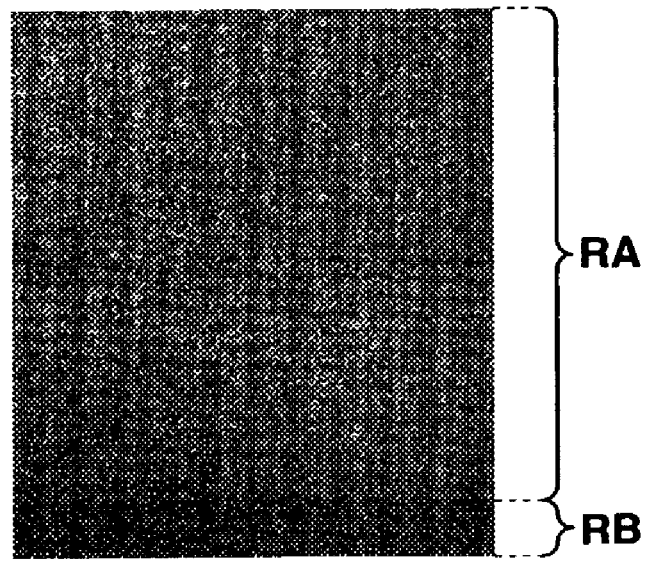
FIGS. 8A, 8B show one example of the read image data showing the relation between the read operation for sensitivity adjustment according to the second embodiment and the image quality of the read image in the normal image read operation.
Figure 8B:
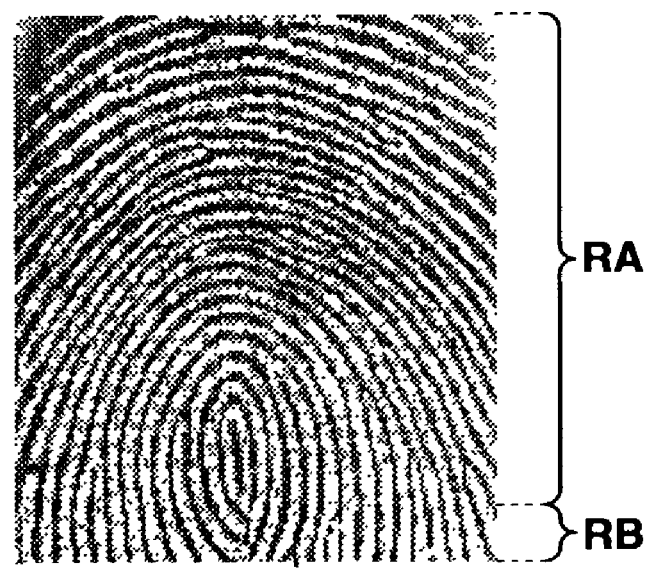

FIGS. 7A to 7D show one example of the read image data showing the relation between the read operation for sensitivity adjustment according to the first embodiment and the image quality of the read image in the normal image read operation; and FIGS. 8A, 8B show one example of the read image data showing the relation between the read operation for sensitivity adjustment according to the second embodiment and the image quality of the read image in the normal image read operation.

When the driving control method according to the first embodiment is applied to the read operation for sensitivity adjustment, in the first region RA, the charge accumulation time (image read sensitivity) set for the i-th row of the photosensor array 100 is set as a minimum time. The charge accumulation time is set so that the time successively lengthens in a first row direction. Therefore, as shown in FIG. 7A, for a bright/dark state of the read image for adjustment, an image which gradually becomes bright toward the first row from the i-th row is obtained. On the other hand, in the second region RB, since the charges are not accumulated, as shown in FIG. 7A, the bright/dark state of the obtained image in a range of the (i+1) to first rows is substantially uniformly bright.

For example, a single-color uniform image (so-called solid image) is used as the subject image to execute the normal image read operation based on the optimum image read sensitivity (charge accumulation period) set based on the bright/dark information of the image for adjustment obtained by the read operation for sensitivity adjustment. In this case, as shown in FIG. 7B, in the first region RA which contributes to a sensitivity setting process, the image having a uniform brightness is obtained in accordance with the subject image. On the other hand, in the second region RB which does not contribute to the sensitivity setting process, the image having brightness different from that of the region RA is obtained. Moreover, when a concave/convex pattern of a fingerprint is used as the subject image to execute the normal image read operation, as shown in FIG. 7C, in the first region RA, the image having a substantially uniform brightness is obtained in accordance with the subject image. On the other hand, in the second region RB, although a difference is not as remarkable as that shown in FIG. 7B, the obtained image is slightly brighter than that of the region RA. That is, it has been found that in the first embodiment a remarkable brightness difference is generated between the regions RA, RB by the pattern and bright/dark state of the subject image. It is to be noted that FIG. 7D shows the read image of the solid image which is not subjected to the sensitivity setting process and in which the defined image read sensitivity (charge accumulation period) is applied as such to the normal read operation for sensitivity adjustment for comparison with the read image shown in FIG. 7B. An image which has a uniform brightness over the whole region is obtained.

From this, it is presumed that the difference of the brightness generated between both the regions RA, RB has a close relation with the reset and read pulses applied to the double gate type photosensors of the (i+1)-th to n-th rows included in the region RB in the read operation for sensitivity adjustment. It is presumed that the difference is generated by a slight difference in a potential state of the top gate electrode between the method of applying first the read pulse, then the reset pulse to the double gate type photosensor, and the original method of applying the read pulse after the reset pulse.

On the other hand, the driving control method according to the second embodiment is applied to the read operation for sensitivity adjustment, and the solid image is used as the subject image to execute the normal image read operation. In this case, as shown in FIG. 8A, the image having a small brightness difference between the regions RA, RB is obtained. Especially, when the concave/convex pattern of the fingerprint is used as the subject image to execute the normal image read operation, as shown in FIG. 8B, the obtained image has a substantially uniform brightness to such a degree that the difference of the brightness is not recognized. It has been found that the image quality is improved. This is because, in the read operation for sensitivity adjustment, without applying the read pulse to the double gate type photosensor of the region RB, only the reset pulse is applied. Further in the normal image read apparatus, the reset pulse is again applied. Thereby, the potential state of the top gate electrode of the double gate type photosensor is approximated by the original reset state.

As described above, when the driving control method according to the second embodiment is applied to the read operation for sensitivity adjustment, the image for adjustment can be read with the image read sensitivity only of the necessary range. Therefore, the generation of the useless read operation time or the useless control process related to the optimum sensitivity extraction process can be reduced, and the read operation for sensitivity adjustment can quickly be performed. Moreover, in the read image by the normal image read operation, the image generated in the region which does not contribute to the sensitivity setting process can be inhibited from being deteriorated.

Third Embodiment

A third embodiment of the driving control method of the photosensor according to the present invention will next be described with reference to the drawings.

Figure 10:
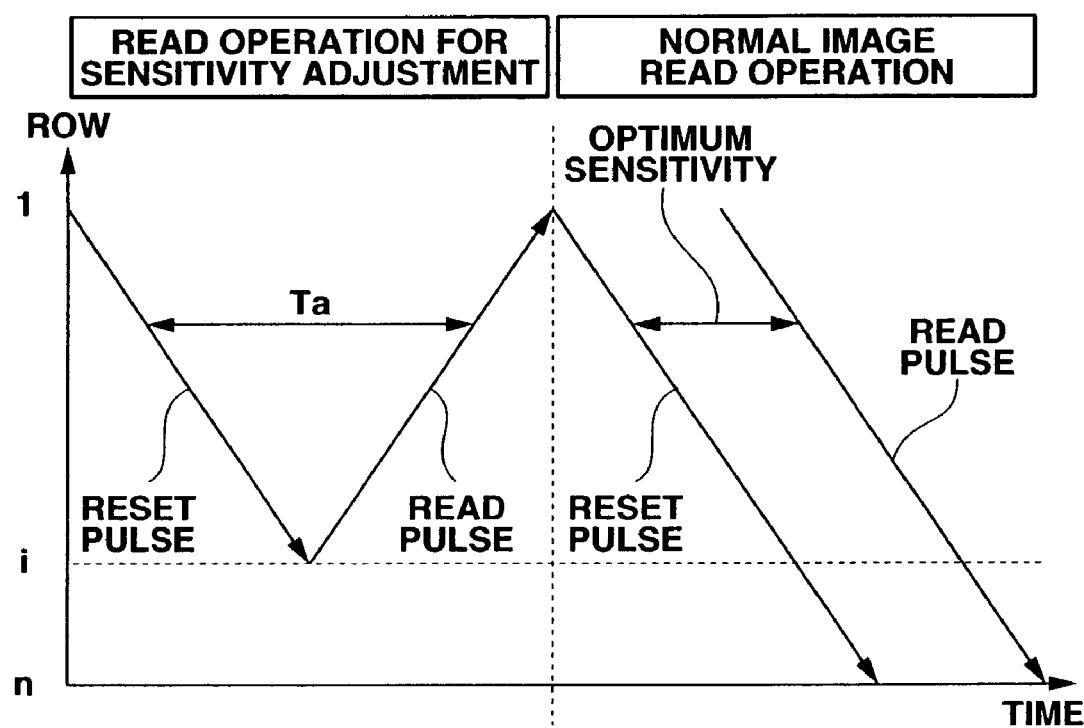
FIG. 10 is a schematic view showing the application states of reset and read pulses in the third embodiment.

FIGS. 9A to 9N are timing charts showing the third embodiment of the driving control method in the read operation for sensitivity adjustment of the photosensor according to the present invention; and FIG. 10 is a schematic view showing the application states of the reset and read pulses in the third embodiment.

Here, the driving control method will also be described appropriately with reference to the photosensor system shown in FIG. 13. Moreover, the description of the control method equal to that of the first embodiment is simplified.

The third embodiment is different from the first embodiment in that the reset and read pulses are set not to be applied to the double gate type photosensors of the (i+1)-th to n-th rows included in the region RB of the photosensor array.

First, as shown in FIGS. 9A to 9F, the driving control method in the read operation for sensitivity adjustment according to the third embodiment comprises: successively applying the reset pulses φT1, φT2, . . . φTi at the deviating timings in the forward direction from the first to i-th rows of the top gate line 101 in the first region RA of the photosensor array 100 at the time interval using the pulse interval Tdelay as the basis, so that the double gate type photosensors 10 of each row of the region RA are successively initialized.

Subsequently, the reset period Treset ends, the charge accumulation period Ta successively starts in each row, and the charges are accumulated in the channel region in accordance with the amount of light incident upon the double gate type photosensor 10 for each row.

Subsequently, as shown in FIGS. 9I to 9L, when the reset operation of applying the reset pulses to the top gate lines 101 of the first to i-th rows included in the region RA of the photosensor array ends, and at an optional timing which does not overlap with the application timing of the reset pulses, the read pulses φBi, . . . φB2, φB1 are successively applied at the deviating timings in the reverse direction from the i-th to first rows of the bottom gate line 102 included in the region RA at the time interval using the pulse interval Tdelay as the basis.

That is, the reset and read pulses are not applied to the double gate type photosensors 10 of the (i+1)-th to n-th rows included in the region RB.

Here, also in the third embodiment, the application timings of the read pulses φBi, . . . φB2, φB1 are set so that the charge accumulation period Tai from the application of the reset pulse φTi until the application of the read pulse φBi in the i-th row as the boundary of the regions RA, RB is minimum (shortest). In the third embodiment, the charge accumulation period Ta in each of the (i−1)-th to first rows increases at the time interval twice the pulse interval Tdelay, and is set as in the above equation (1) similarly as the first embodiment.

Furthermore, as shown in FIG. 9M, the precharge pulse φpg is applied to the precharge switch 132 with respect to the double gate type photosensors connected to the i-th to first row bottom gate lines 102 prior to the application of the read pulses φBi, φBi−1, . . . φB2, φB1 and in parallel with the charge accumulation period set for each row. Thereby, the precharge voltage Vpg is applied to the data line 103 of each-row double gate type photosensor 10 for the precharge period Tprch, and subsequently the read period Tread starts.

Subsequently, by the application of the above-described read pulses φBi, φBi−1, . . . φB2, φB1, in the double gate type photosensors 10 of the i-th to first rows included in the region RA in which the respective different charge accumulation periods Ta are set, as shown in FIG. 9N, the voltage changes VD1, VD2, VD3, . . . VDm corresponding to the charges accumulated in the respective charge accumulation periods Ta are taken in and read out by the column switch 131 via the drain line 103.

Thereby, similarly as the first and second embodiments, as shown in FIG. 10, by the read process of one screen in which only the photosensors of the predetermined image read region for sensitivity adjustment of the photosensor array are used, the i types of different image read sensitivities are set. Moreover, the image for adjustment can be read with the image read sensitivity only of the necessary range in the normal image read operation. Therefore, the useless control process and time wasted in the read operation for sensitivity adjustment are reduced, and the image read sensitivity can quickly and easily be set.

Moreover, similarly as the second embodiment, the read image in the normal image read operation can be inhibited from being deteriorated by the application of the reset and read pulses into the region RB which does not contribute to the sensitivity setting process.

Here, a relation between the read operation for sensitivity adjustment according to the third embodiment and the image quality of the read image in the normal image read operation will be described in detail with reference to the drawings.

Figure 11A:
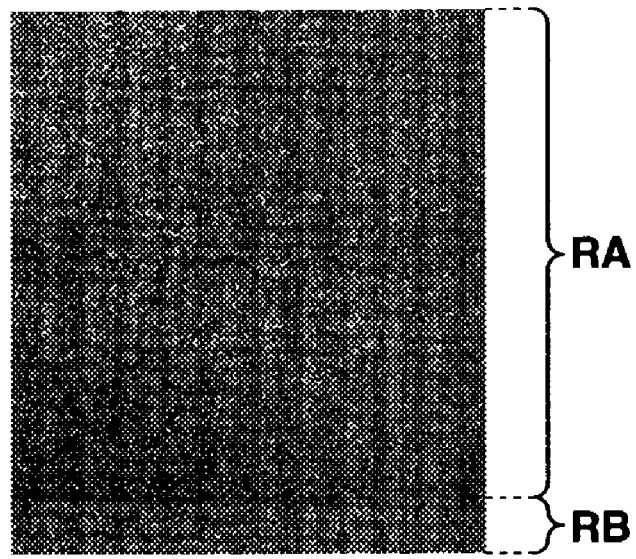
FIGS. 11A, 11B show one example of the image data showing the relation between the read operation for sensitivity adjustment according to the third embodiment and the image quality of the read image in the normal image read operation.
Figure 11B:
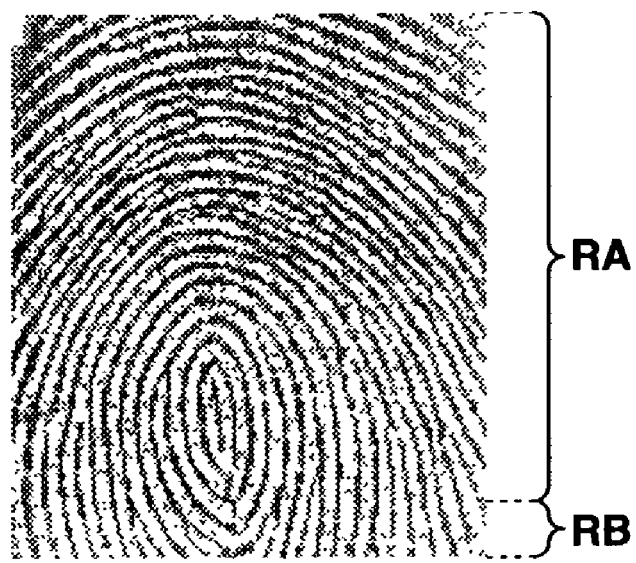

FIGS. 11A, 11B show one example of the image data showing the relation between the read operation for sensitivity adjustment according to the third embodiment and the image quality of the read image in the normal image read operation. Note that the image data (FIGS. 7A to 7C, 8A, 8B) in the first and second embodiments is referred to if necessary.

The driving control method according to the third embodiment is applied to the read operation for sensitivity adjustment, and the solid image is used as the subject image to execute the normal image read operation. In this case, as shown in FIG. 11A, in the obtained image, the difference of the brightness between the regions RA, RB is small as compared with that of the image data (see FIG. 7B) described in the first embodiment. Particularly, when the concave/convex pattern of the fingerprint is used as the subject image to execute the normal image read operation, as shown in FIG. 11B, substantially similarly to the image data (see FIG. 8B) described in the second embodiment, the obtained image has a substantially uniform brightness to such a degree that the difference of the brightness is not recognized. It has been found that the image quality is improved. This is because in the read operation for sensitivity adjustment, the reset and read pulses are not applied to the double gate type photosensor of the region RB, only the reset pulse. Further in the normal image read operation, the reset pulse is applied. Thereby, the potential state of the top gate electrode of the double gate type photosensor is approximated by the original reset state.

Note that, although difficult to see in FIG. 11B, in the region RA, after successively applying the reset, precharge, and read pulses by the read operation for sensitivity adjustment, the reset pulse is applied by the normal image read operation. Therefore, the image becomes slightly dark as compared with the region RB, but the image quality is not largely deteriorated.

Note that, in the above-described embodiments, as described in the conventional art of FIGS. 15A to 15J, the reset and read pulses are successively applied in the opposite directions, and the image read sensitivity is successively changed. The invention applied to the read operation for sensitivity adjustment using this setting method of the charge accumulation period has been described, but is not limited to this operation.

For example, the present invention may also be applied to the read operation for sensitivity adjustment using the method of simultaneously applying the reset pulses to the respective rows and subsequently successively applying the read pulses so that the charge accumulation period differs with each row. In short, in the constitution of the read operation for sensitivity adjustment, for example, the image read sensitivity is changed for each row, and the image by a plurality of stages of image read sensitivities is acquired by the image read operation of one screen, it is unnecessary to use the whole region (all row ranges) of the sensor array, and only some regions (row ranges) may be used. The present invention can satisfactorily be applied to this constitution.

Moreover, in the two-dimensional image read apparatus to which the photosensor system according to the present invention is applied in the respective embodiments, the fingerprint is used as the subject. This example has been described, but the present invention is not limited to this. Needless to say, the subjects including the two-dimensional image having the bright/dark pattern, such as a printed matter and photograph, may also be used.

What is claimed is:

1. A photosensor system comprising:
    an image read section which includes an image read region formed by arranging a plurality of photosensors in a matrix form including a predetermined number of rows and columns, wherein the image read region includes a sensitivity adjustment image read region, and the sensitivity adjustment image read region includes a plurality of rows of the photosensors less than the predetermined number of rows, and wherein the image read section performs a read operation of a subject image by the image read region in accordance with a predetermined image read sensitivity; and
    a read operation sensitivity adjustment means for performing a read operation for sensitivity adjustment which includes:
        setting different charge accumulation periods with respect to the photosensors of different areas of the sensitivity adjustment image read region;
        reading an image for adjustment only in the sensitivity adjustment image read region based on the respective charge accumulation periods; and
        deriving an optimum image read sensitivity suitable for the read operation of the subject image in the image read section.

2. The photosensor system according to claim 1, wherein the read operation for sensitivity adjustment in the sensitivity adjustment image read region is executed at an optional timing prior to at least the read operation of the subject image by the image read section.

3. The photosensor system according to claim 1, wherein the read operation sensitivity adjustment means executes control in the read operation for sensitivity adjustment so that the charge accumulation period is set to be different for each of the rows of the sensitivity adjustment image read region.

4. The photosensor system according to claim 1, wherein with respect to the plurality of photosensors of the plurality of rows of the sensitivity adjustment image read region, the read operation sensitivity adjustment means includes:

a reset means for applying reset pulses to the plurality of photosensors of each row, and for initializing the plurality of photosensors of each row;
    a precharge means for applying precharge pulses of a predetermined voltage to the plurality of photosensors, and for precharging the plurality of photosensors;
    a reading means for applying read pulses to the plurality of photosensors of each row, after the initialization ends, the respective charge accumulation period elapses, and a precharge operation to apply the precharge pulses ends; and
    an output means for reading the voltage which is applied by the precharge operation and which changes in accordance with the charges accumulated in the respective charge accumulation periods, and for outputting an output voltage in a read period in which the read pulses are applied.

5. The photosensor system according to claim 4, wherein in the read operation for sensitivity adjustment in the sensitivity adjustment image read region, the read operation sensitivity adjustment means sets at least an application timing of the reset pulse of each row by the reset means and an application timing of the read pulse of each row by the reading means such that the timings do not overlap with each other, and executes control so that the charge accumulation period for each row includes an overlapped period between at least two different rows.

6. The photosensor system according to claim 5, wherein the read operation sensitivity adjustment means executes control in the read operation for sensitivity adjustment so as to successively apply the reset pulses to the photosensors of each row of the image read region of the photosensor array and successively apply the read pulses to the photosensors of each row of the image read region of the photosensor array.

7. The photosensor system according to claim 5, wherein the read operation sensitivity adjustment means executes control in the read operation for sensitivity adjustment so as to successively apply the reset pulses to the photosensors of each row of all regions of the photosensor array and successively apply the read pulses to the photosensors of each row of the sensitivity adjustment image read region of the photosensor array.

8. The photosensor system according to claim 5, wherein the read operation sensitivity adjustment means executes control in the read operation for sensitivity adjustment so as to successively apply the reset and read pulses to the photosensors of each row of the sensitivity adjustment image read region of the photosensor array.

9. The photosensor system according to claim 5, wherein the read operation sensitivity adjustment means executes control in the read operation for sensitivity adjustment so as to perform the application timing of the reset pulses to the photosensors of each row of the sensitivity adjustment image read region of at least the photosensor array and the application timing of the read pulses to the photosensors of each row in mutually opposite row orders.

10. The photosensor system according to claim 4, wherein each photosensor comprises a semiconductor layer including a channel region, source and drain electrodes formed opposite to each other via the channel region, first and second gate electrodes formed above and below at least the channel region via an insulating film, and wherein one of the first and second gate electrodes is used as an irradiation side and charges corresponding to an amount of light emitted from the irradiation side are generated and accumulated in the channel region, the reset means performs a reset operation to apply the reset pulse to the first gate electrode for initialization;

the precharge means performs a precharge operation to apply the precharge pulse to the drain electrode, the read means performs a read operation to apply the read pulse to the second gate electrode, after the reset operation ends, the respective charge accumulation period elapses, and the precharge operation ends; and the output means performs an output operation to output a voltage of the drain electrode as the output voltage in a read period in which the read pulse is applied.

11. The photosensor system according to claim 1, wherein the read operation sensitivity adjustment means includes:

an image read means for reading the image for adjustment with a plurality of image read sensitivities based on the respective charge accumulation periods; and an optimum image read sensitivity derivation means for deriving the optimum image read sensitivity based on the image for adjustment read by the image read means for each image read sensitivity.

12. The photosensor system according to claim 11, wherein the optimum image read sensitivity derivation means includes:

data extraction means for extracting maximum and minimum values of a pixel data group for each image read sensitivity based on an image pattern of the image for adjustment read by the image read means;

data range calculation means for calculating a data range of the pixel data group for each image read sensitivity based on the maximum and minimum values of the pixel data group for each image read sensitivity; and means for deriving the optimum image read sensitivity based on a change of the data range for each image read sensitivity.

13. The photosensor system according to claim 12, wherein the optimum image read sensitivity derivation means includes:

means for comparing data ranges of the respective image read sensitivities with one another, and for extracting the image read sensitivity having a maximum data range; and means for determining the optimum image read sensitivity based on the extracted image read sensitivity.

14. The photosensor system according to claim 1, wherein each photosensor includes:

source and drain electrodes formed opposite to each other via a channel region including a semiconductor layer, first and second gate electrodes formed above and below at least the channel region via an insulating film, and wherein one of the first and second gate electrodes is used as an irradiation side and charges generated in accordance with an amount of light emitted from the irradiation side are generated and accumulated in the channel region.

15. A driving control method for a photosensor system which includes an image read region that includes a predetermined number of rows and columns and that is formed by arranging a plurality of photosensors in a matrix form, and wherein a subject image is read by the image read region, the method comprising:

setting different charge accumulation periods with respect to the photosensors of different areas of a sensitivity adjustment image read region that includes a plurality of rows of the photosensors less than the predetermined number of rows, and reading an image for adjustment only in the sensitivity adjustment image read region based on the respective charge accumulation periods; and deriving an optimum image read sensitivity suitable for reading the subject image from the image for adjustment.

16. The driving control method according to claim 15, wherein the reading of the image for adjustment in the sensitivity adjustment image read region includes:

applying reset pulses to the plurality of photosensors of each row of the sensitivity adjustment image read region and initializing the plurality of photosensors of each row;

applying precharge pulses of a predetermined voltage to the plurality of photosensors and precharging the plurality of photosensors;

applying read pulses to the plurality of photosensors of each row of the sensitivity adjustment image read region, after the initialization ends, a predetermined charge accumulation period elapses, and the precharge ends, and at a timing which does not overlap with an application timing of the reset pulses for each row and in which the respective charge accumulation period for each row includes an overlapped period between at least two different rows; and reading the voltage which is applied by the precharge and which changes in accordance with the charges accumulated in the respective charge accumulation periods and outputting an output voltage in a read period in which the read pulses are applied.

17. The driving control method according to claim 16, wherein the applying of the reset pulse includes a process of applying the reset pulse to the photosensors of each row of the image read region, and the applying of the read pulse includes applying the read pulse to the photosensors of each row of the image read region.

18. The driving control method according to claim 16, wherein the applying of the reset pulse includes a process of applying the reset pulse to the photosensors of each row of the image read region, and the applying of the read pulse includes applying the read pulse to the photosensors of each row of the sensitivity adjustment image read region.

19. The driving control method according to claim 16, wherein the applying of the reset pulse includes a process of applying the reset pulse to the photosensors of each row of the sensitivity adjustment image read region, and the applying of the of read pulse includes a process of applying the read pulse to the photosensors of each row of the sensitivity adjustment image read region.

20. The driving control method according to claim 16, wherein the applying of the reset pulse includes a process of applying the reset pulse to the photosensors of each row of the sensitivity adjustment image read region in a predetermined row order, and the applying of the read pulse includes a process of applying the read pulse to the photosensors of each row of the sensitivity adjustment image read region in a row order reverse to the predetermined row order.

21. The driving control method according to claim 15, wherein the deriving of the optimum image read sensitivity includes:

reading the image for adjustment with a plurality of image read sensitivities based on the respective charge accumulation periods; and deriving the optimum image read sensitivity based on the image for adjustment read with the plurality of image read sensitivities.

22. The driving control method according to claim 21, wherein the deriving of the optimum image read sensitivity includes:

extracting maximum and minimum values of a pixel data group for each image read sensitivity based on an image pattern of the image for adjustment read with the plurality of image read sensitivities;

calculating a data range of the pixel data group for each image read sensitivity based on the maximum and minimum values of the pixel data group for each image read sensitivity; and deriving the image read sensitivity based on a change of the data range for each image read sensitivity.

23. The driving control method according to claim 22, wherein the deriving of the optimum image read sensitivity includes:

comparing data ranges of the respective image read sensitivities with one another and extracting the image read sensitivity having a maximum data range; and determining the optimum image read sensitivity based on the extracted image read sensitivity.

* * * * *